Feb. 27, 1968

A. W. AMACHER 3,371,241

VEHICLE LIGHT DIMMING SYSTEM INCLUDING SOLID STATE
CIRCUITRY AND MANUAL CONTROL MEANS

Filed June 25, 1965

INVENTOR

*Arthur W. Amacher*

BY
*Miller Morris & Pappas*

ATTORNEYS

INVENTOR
ARTHUR W. AMACHER
BY
ATTORNEYS

United States Patent Office 3,371,241
Patented Feb. 27, 1968

3,371,241
VEHICLE LIGHT DIMMING SYSTEM INCLUDING SOLID STATE CIRCUITRY AND MANUAL CONTROL MEANS
Arthur W. Amacher, 718 Cawood, Lansing, Mich. 48915
Filed June 25, 1965, Ser. No. 466,922
4 Claims. (Cl. 315—77)

ABSTRACT OF THE DISCLOSURE

A manually controlled vehicle light dimming system comprising a manual rheostat, a switch means, and a solid state circuit including a sawtooth generator and a power line switch to receive the sawtooth output and control the amount of line current passed from the vehicle power supply to the lights inversely in accordance with the amplitude of the sawtooth spikes. The spike amplitude and then the light output is controlled by the manual rheostat coupled as a biasing voltage divider between ground and the output line from the sawtooth generator to the power switch. The rheostat also controls the condition of the switch means to permit the solid state circuit to be by-passed and shut down.

---

This invention relates to manual means for dimming the lights of a motor vehicle, and more particularly to a light dimming system of the type providing a manual means of progressively dimming the lights to a selected level of intensity.

This invention is particularly useful on military vehicles engaged in movements along front lines or in enemy territory. It allows the driver to dim his headlights to the point where they would not be easily visible to the enemy, but still provide enough light to enable the driver to see the path ahead. The instrument and tail lights could also be dimmed, thus making the vehicle more difficult to detect.

Prior art systems are generally unsatisfactory for a variety of reasons; such as being bulky, heat producing and not giving full range performance. One example of a prior art system is a carbon pot. These are large and bulky devices which waste a great amount of power in the form of useless heat and thus are unsatisfactory.

A circuit related to that of the present invention is described in the June issue of Radio-Electronics; vol. XXXV, No. 6, June 1964, beginning at page 37. There is no suggestion in this article of use of the disclosed circuit in motor vehicles as a light dimmer. One of the circuits shown has a control range of about 15% as a minimum and about 90% as a maximum. Another circuit is also shown which provides better performance, but both are designed to operate off of an alternating current power line, and are generally more complicated and more expensive than the circuits of the present invention disclosed herein although these prior art circuits can be used in the present invention if powered by direct current.

The present invention provides a manual light dimming system which overcomes the problems and faults of other systems. It is simple yet rugged, compact, and is stable over a wide range of operating voltages. It employs relatively simple, inexpensive components, has no warm-up delay or temperature sensitivity, interconnects with existing headlight energizing circuits, is easily serviced, and is energized directly from the vehicle battery, requiring no additional power supply means.

I have pointed out certain of the features, objects, and advantages of my invention in the foregoing statements. These and other objects and purposes will become increasingly apparent from the following description and the accompanying drawings wherein.

Figure 1:
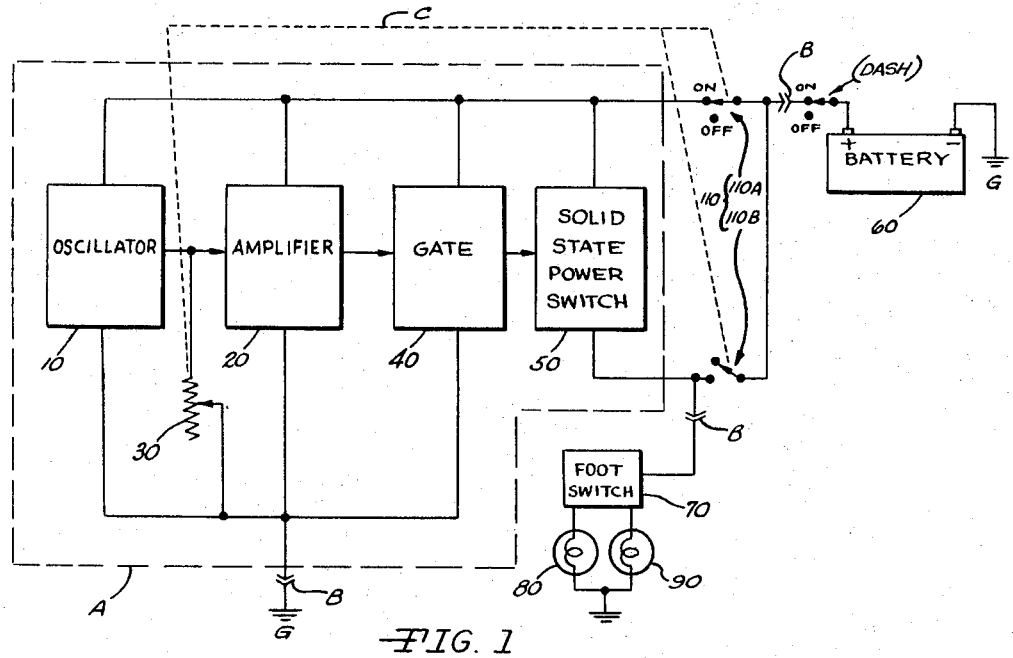
FIGURE 1 is a schematic block diagram illustrating the light dimmer system of the present invention and particularly illustrating the major components in the system.

Referring to FIGURE 1, a block diagram of the light dimmer system is shown. The electrical output of the oscillator means 10 is applied to the amplifier means 20, with variable resistance means (rheostat) 30 regulating the voltage to the amplifier means 20, and the electrical output of the amplifier means 20 is applied to gate means 40, the output of which controls a solid state power or line switch 50. The headlight system includes a conventional vehicle battery or other direct current voltage source 60, a standard foot operated dimmer switch 70, low beam or "dim" filaments 80, high beam or "bright" filaments 90, and a dash headlight switch 111.

As shown in FIGURE 1, the long dashed lines define a support or housing for unit A including the oscillator means 10, amplifier means 20, variable resistance means 30, gate means 40, and solid state power switch 50. Unit A includes plug type or other suitable connectors as indicated by B, whereby the compact unit A may be readily installed in vehicles. The short dashed lines C indicate that the variable resistance means 30 and a double pole single throw switch 110 are mounted and operate on a single shaft which extends through the dashboard of a motor vehicle.

Figure 2:
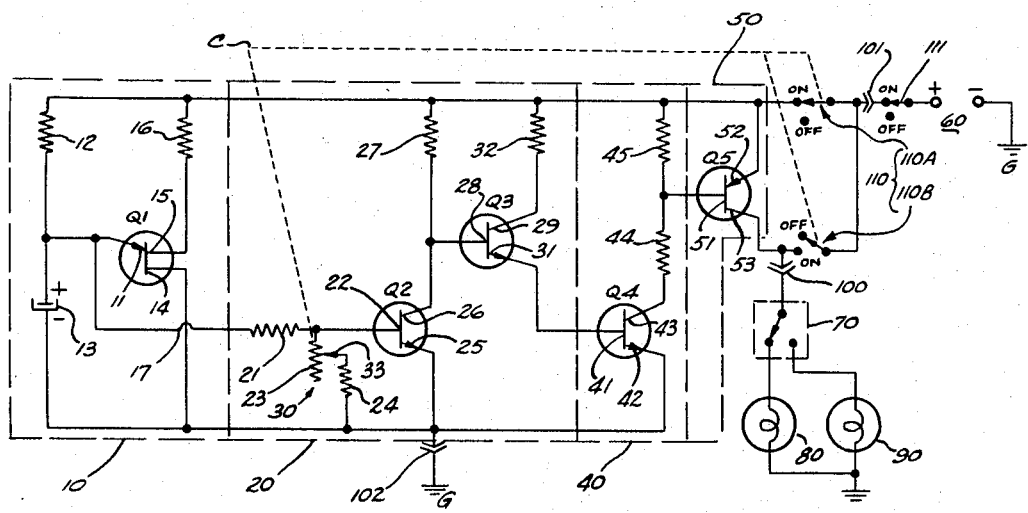
FIGURE 2 is a schematic wiring diagram illustrating a preferred embodiment of the light dimmer system of the present invention utilizing a unijunction transistor in the oscillator circuit.

Having generally described the light dimmer system of the present invention, FIGURE 2 shows a detailed circuit diagram of a preferred form of the dimmer system.

The oscillator means 10 includes a unijunction transistor Q1 having the emitter 11 connected through resistor 12 to the positive side of the voltage source 60 and a condenser 13 connected to emitter 11 of Q1 and to ground G. A first base 14 is connected to the negative side of the voltage source 60 or to ground G and a second base 15 is connected through resistor 16 to the positive side of the voltage source 60. Transistor Q1 and its associated parts 12, 13 and 16, form a sawtooth oscillator whose voltage is developed across condenser 13.

The amplifier means 20 and resistance means 30 includes transistors Q2 and Q3 shown as NPN types, which constitute direct coupled amplifiers for amplifying the variations in current flowing through line 17 coupled to emitter 11 of transistor Q1 and base 22 of transistor Q2 through resistor 21. One side of rheostat 30 is connected to the base 22 of transistor Q2. The wiper 33 and resistor 23 of resistance means 30 is connected through resistor 24 to ground G. The emitter 25 of transistor Q2 connects to ground G and the collector 26 connects through resistor 27 to the positive side of voltage source 60. The base 28 of transistor Q3 is directly coupled to the collector 26 of transistor Q2 and the base 28 of transistor Q3 is also connected through resistor 27 to the positive side of voltage source 60. The collector 29 of transistor Q3 is connected through resistor 32 to the positive side of voltage source 60, and the emitter 31 of transistor Q3 is directly coupled to base 41 of transistor Q4.

The gate means 40 includes transistor Q4 having the emitter 42 of transistor Q4 connected to ground G and the collector 43 connected to the positive side of voltage source 60 through resistor 44 and resistor 45.

The solid state power switch 50 includes a solid state power transistor or line switch Q5, shown as PNP type, with its base 51 connected to the junction of resistor 44 and resistor 45. The emitter 52 of transistor Q5 is directly connected to the positive side of voltage source 60 and the collector 53 of transistor Q5 connects through connector 100, to the standard foot operated dimmer switch and hence through the light filaments 80 and 90 to ground G.

It is to be noted that all of the components previously described as being connected to the positive side of the power supply 60 are, in fact, coupled together with the positive battery line through a common connection means 101. Similarly, all of the connections described as going to ground G or to the negative side of the power supply 60 are made through a common connection means 102.

The preferred kinds and values of the components in the preferred circuit illustrated in FIGURE 2 are:

| | |
|---|---|
| Q1 | 2N2160. |
| Q2 | 2N697. |
| Q3 | 2N696. |
| Q4 | 2N1613. |
| Q5 | 2N278. |
| 13 | 5 microfarads; 15 volts. |
| 12 | 2,200 ohms. |
| 16 | 220 ohms. |
| 21 | 10,000 ohms. |
| 23 | 15,000 ohms. |
| 24 | 1,000 ohms. |
| 27 | 560 ohms. |
| 32 | 220 ohms. |
| 44 | 35 ohms. |
| 45 | 56 ohms. |
| 110 | DPST switch (Double Pole Single Throw) alternate action (1 on, 1 off). |

The operation of the circuit shown in FIGURE 2, with headlight dash switch 111 closed (on) is as follows: Transistor Q1, condenser 13, resistor 12, and resistor 16 form a sawtooth oscillator. The sawtooth voltage that is developed across condenser 13 is coupled to base 22 of transistor Q2 by line 17 and through resistor 21.

Current flows from base 28 of transistor Q3 through resistor 27. This normally holds Q3 on which allows current to flow from base 41 of transistor Q4 turning Q4 on. Current flows through Q4 and resistor 44 and into base 51 of transistor switch Q5. Transistor Q5 is turned on and current flows through headlight filament 80.

When a sawtooth spike enters the base 22 of transistor Q2, transistor Q2 conducts current and grounds the base 28 of transistor Q3 shutting it off. With no current flowing from base 41 of transistor Q4, transistor Q4 is shut off and no current flows into base 51 of transistor switch Q5 permitting no current to flow through the headlight circuit.

Rheostat 30, resistor 21, and resistor 24 form a variable bias for the base 22 of transistor Q2. When the resistance of rheostat 30 is low (turned full clockwise), the sawtooth spikes are effectively grounded and transistor Q2 is off so that transistor Q5 passes full line current and then the headlights are bright. As the resistance of rheostat 30 is raised, the base 22 of transistor Q2 is partially isolated from ground allowing part of the sawtooth spike to enter, thus shutting off the following circuit for a short period of time. The headlight filaments 80 or 90 receive almost full power and are only slightly dimmed. As the resistance of rheostat 30 is increased, the base 22 of transistor Q2 is further isolated from ground allowing more of the sawtooth spike to enter. This results in the headlight filaments 80 or 90 receiving even less power and becoming dimmer. When the resistance of rheostat 30 is increased to maximum (turned full counterclockwise), all of the sawtooth spike enters the base 22 of transistor Q2 and the lights 80 and 90 are shut off entirely. The foregoing action is, of course, continuously controllable from 0 to maximum.

If desired resistor 44 may be replaced by a small pilot bulb with the proper characteristics. This bulb may be placed on the dash to be used as a visual indication that the unit is on and operating. The bulb also dims in the same manner as the headlights.

As was mentioned earlier, the double pole single throw switch 110 is preferably mounted on the same shaft as rheostat 30. The purpose of switch 110 is as follows: when the shaft of rheostat 30 and switch 110 is turned fully counterclockwise until it snaps, section 110A of switch 110 disconnects (off) the entire variable dimmer control unit from voltage source 60. At the same instant, section 110B of switch 110 closes (on) bypassing transistor switch Q5 and section 110A of switch 110.

Figure 3:
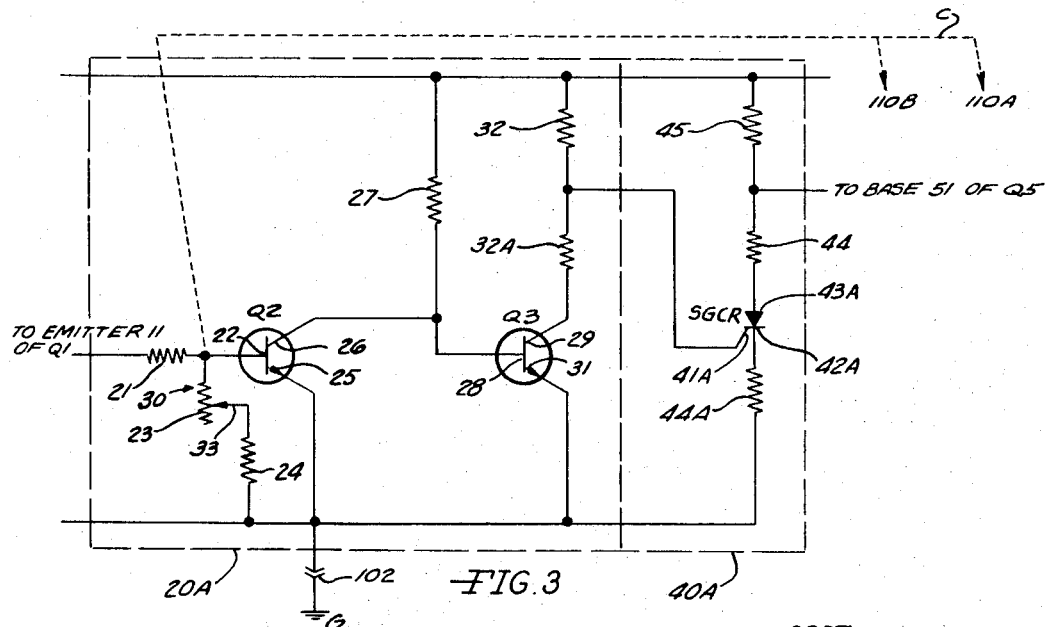
FIGURE 3 is a schematic wiring diagram particularly illustrating another gate circuit embodiment which can be used in the light dimmer of the present invention.

FIGURE 3 shows an amplifier circuit 20A and gate circuit 40A which may be substituted for the amplifier circuit 20 and gate circuit 40 shown in FIGURE 2. The amplifier circuit 20A includes transistor Q3 with emitter 31 connected to ground G and collector 29 connected to the positive side of the voltage source 60 through resistor 32A and resistor 32. The remaining connections follow those in FIGURE 2.

The gate circuit 40A includes a (SGCR) silicon gate controlled rectifier having cathode 42A connected through resistor 44A to ground G, gate 41A is connected to the junction of resistor 32 and resistor 32A, and anode 43A is connected to the positive side of the voltage source 60 through resistor 44 and resistor 45. The base 51 of transistor Q5 is connected to the junction of resistor 44 and resistor 45. The SGCR is of the gate turn-off type; that is, it can be turned off by applying a reverse current to the gate 41A. Resistor 44A acts as a cathode bias resistor for the SGCR. Resistor 32A is to prevent excess reverse current from flowing into the SGCR gate 41A.

The preferred kinds and values of the components in the circuit illustrated in FIGURE 3 are:

| | |
|---|---|
| Q1 | 2N2160. |
| Q2 | 2N697. |
| Q3 | 2N696. |
| Q5 | 2N278. |
| 12 | 2,200 ohms. |
| 13 | 2 microfarads; 15 volts. |
| 16 | 220 ohms. |
| 21 | 8,200 ohms. |
| 23 | 2,500 ohms. |
| 24 | 750 ohms. |
| 27 | 15,000 ohms. |
| 32 | 2,200 ohms. |
| 32A | 150 ohms. |
| 44 | 10 ohms. |
| 44A | 30 ohms or pilot bulb. |
| 45 | 22 ohms. |

The operation of the circuit shown in FIGURE 3 is as follows: In the absence of a sawtooth spike the amplifier is not energized and resistor 32 normally holds the SGCR in the on state. In the presence of a spike the amplifier is energized grounding the gate 41A of the SGCR. This condition makes the gate 41A of the SGCR more negative than the cathode 42A of the SGCR, producing a reverse current flow which snaps the SGCR off, stopping the flow of current into the base 51 of transistor Q5, thereby turning off transistor Q5 and the headlights.

Figure 4:
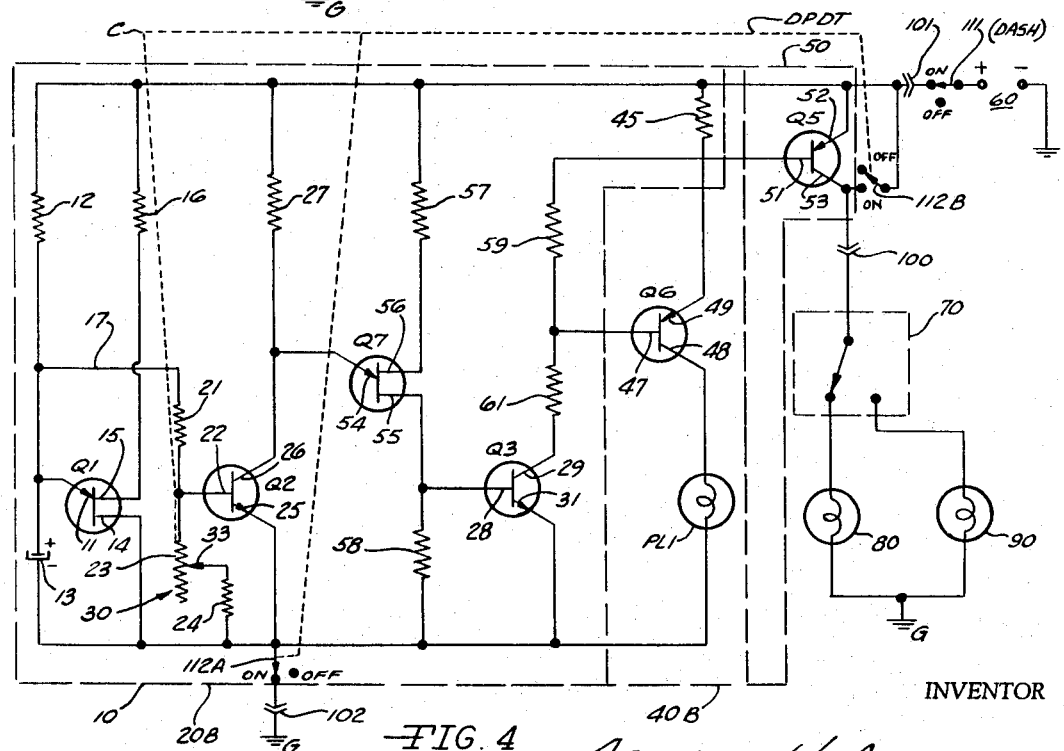
FIGURE 4 is a schematic wiring diagram illustrating a preferred amplifier and gate circuit incorporating a unijunction transistor to provide a square wave form.

FIGURE 4 shows a detailed circuit diagram of a preferred circuit which contains an amplifier circuit 20B and a gate circuit 40B which may be substituted for the amplifier and gate circuit shown in FIGURE 2.

The amplifier and gate circuits 20B and 40B include a unijunction transistor Q7, transistor Q3 shown as NPN and transistor Q6 shown as PNP types. The emitter 54 is directly coupled to collector 26 of transistor Q2 and also connected through resistor 27 to the positive side of voltage source 60. Second base 56 of transistor Q7 is connected to the positive side of voltage source 60 through resistor 57 and first base 55 is connected through resistor 58 to ground G. The emitter 31 of transistor Q3 is connected to ground G and the collector 29 is connected to the positive side of voltage source 60 through resistors 61, 59 and 45. The collector 48 of transistor Q6 is connected through pilot light PL1 to ground G. The base 47 of transistor Q6 is connected to the junction of resistors 61 and 59. The emitter 49 of transistor Q6 is connected to the positive side of voltage of voltage source 60 through resistor 45. The switches 112A and 112B are in combination in a double pole double throw switch (DPDT) with alternate action (one on and one off). The remaining circuit details follow those described in FIGURE 2.

The preferred kinds and values of the components in FIGURE 4 are:

| | |
|---|---|
| Q1 | 2N2160. |
| Q2 | 2N697. |
| Q7 | 2N2160. |
| Q3 | 2N697. |
| Q5 | 2N278. |
| Q6 | 2N1183. |
| 12 | 2,200 ohms. |
| 13 | 2 microfarads; 15 volts. |
| 16 | 220 ohms. |
| 21 | 10,000 ohms. |
| 23 | 2,500 ohms control, linear taper. |
| 24 | 680 ohms. |
| 27 | 1,000 ohms. |
| 45 | 22 ohms. |
| 57 | 1,600 ohms. |
| 58 | 360 ohms. |
| 61 | 680 ohms. |
| 59 | 100 ohms. |
| PL1 | 1891. |
| 112 | DPDT (double pole double throw) alternate action (1 on, 1 off). |

The circuit shown in FIGURE 4 is especially preferred because the unijunction transistor Q7 produces a square voltage wave which produces almost instantaneous response in the remainder of the circuit. Further the circuit operates very well under the most adverse of operating conditions and can be sealed.

The operation of the circuit shown in FIGURE 4 with headlight dash switch 111 closed (on) is as follows: In the absence of a sawtooth spike the amplifier 20B is not energized and resistor 27 normally holds transistor Q7 on. A square wave form is produced from the transistor Q7. Current flowing through resistor 58 produces a positive voltage on base 28 of transistor Q3. This turns Q3 on allowing current to flow in to base 47 of transistor Q6 turning it on. Current flows through pilot light PL1 and transistor Q6 and into base 51 of transistor Q5 turning it on and also the headlights.

In the presence of a spike the amplifier is energized grounding the emitter 54 of transistor Q7. This snaps off the whole gate circuit 40B stopping the flow of current into the base 51 of transistor Q5 which shuts Q5 off and also the headlights.

While certain specific embodiments of the invention have been disclosed in the foregoing description, it will be understood that various modifications within the spirit of the invention may occur to those skilled in the art. Therefore, it is intended that no limitations be placed on the invention except as defined by the scope of the appended claims.

I claim:

1. A motor vehicle light control system for selectively regulating the brightness of the lights by controls on the dashboard of the motor vehicle which comprises:
    (a) a direct current voltage source;
    (b) light filaments;
    (c) voltage oscillator means connected to the voltage source;
    (d) a dashboard controlled manually variable resistance connected between the output of the voltage oscillator means and ground, for selectively reducing the maximum voltage output from the oscillator means;
    (e) solid state amplifier means responsive to the output of the oscillator means and including a unijunction transistor for producing a square voltage waveform;
    (f) solid state gate means responsive to the output of the amplifier means;
    (g) circuit connection means for connecting the voltage source to the light filaments;
    (h) a solid state transistor line switch in the circuit connection means for interrupting the connection of the voltage source to the light filaments, said line switch being responsive to a condition of the gate means, whereby variations in the selection of the setting of the variable resistance determines the brightness of the lights; and
    (i) dashboard controlled circuit means for selectively by-passing said line switch to directly connect the voltage source to the light filaments.

2. A motor vehicle light control system for selectively regulating the brightness of the lights by controls on the dashboard of the motor vehicle which comprises:
    (a) a direct current voltage source;
    (b) light filaments;
    (c) voltage oscillator means connected to the voltage source;
    (d) a manually variable resistance connected between the output of the voltage oscillator means and ground, the resistance comprising a rheostat with a rotatable wiper on a shaft which extends through the dashboard of the vehicle for selectively reducing the maximum voltage output from the voltage oscillator means;
    (e) solid state amplifier means responsive to the output of the oscillator means;
    (f) solid state gate means responsive to the output of the amplifier means;
    (g) circuit connection means for connecting the voltage source to the light filaments;
    (h) a solid state transistor line switch in the circuit connection means for interrupting the connection of the voltage source to the light filaments, said line switch being responsive to a condition of the gate means, whereby variations in the selection of the setting of the variable resistance determines the brightness of the lights; and
    (i) dashboard controlled circuit means coupled to said variable resistance such that at the maximum resistance of the variable resistance the wiper shaft actuates the circuit means for selectively by-passing said line switch to directly connect the voltage source to the light filaments.

3. Claim 2 wherein the amplifier means contains in addition a unijunction transistor for producing a square voltage wave form from the amplifier means.

4. Claim 2 wherein the circuit means for by-passing the line switch includes a double pole single throw switch which is actuated by the movement of the shaft to the preset maximum resistance.

(References on following page)

References Cited

UNITED STATES PATENTS

| | | | |
|---|---|---|---|
| 1,235,244 | 7/1917 | Reed | 315—82 |
| 3,169,212 | 2/1965 | Walters | 315—223 |
| 3,213,343 | 10/1965 | Sheheen | 307—88.5 X |
| 3,225,309 | 12/1965 | Phelps | 307—88.5 X |

OTHER REFERENCES

Radio-Electronics, vol. XXXV, No. 6, June 1964, "Transistors Control High-power D.C." by Alvin F. Rymsha, pp. 37–39.

JAMES W. LAWRENCE, *Primary Examiner.*

P. C. DEMEO, *Assistant Examiner.*